(12) United States Patent
Seitz

(10) Patent No.: US 10,253,845 B2
(45) Date of Patent: Apr. 9, 2019

(54) METHOD AND DEVICE FOR CONNECTING A WIRE CABLE TO A CABLE GUIDE

(71) Applicant: TRW Automotive GmbH, Alfdorf (DE)

(72) Inventor: Martin Seitz, Schwaebisch Gmund (DE)

(73) Assignee: TRW Automotive GmbH, Alfdorf (DE)

( * ) Notice: Subject to any disclaimer, the term of this patent is extended or adjusted under 35 U.S.C. 154(b) by 1001 days.

(21) Appl. No.: 14/349,698

(22) PCT Filed: Oct. 10, 2012

(86) PCT No.: PCT/EP2012/004241
§ 371 (c)(1),
(2) Date: Apr. 4, 2014

(87) PCT Pub. No.: WO2013/056795
PCT Pub. Date: Apr. 25, 2013

(65) Prior Publication Data
US 2015/0059132 A1  Mar. 5, 2015

(30) Foreign Application Priority Data

Oct. 19, 2011 (DE) .................. 10 2011 116 287

(51) Int. Cl.
*B21D 37/00* (2006.01)
*F16G 11/02* (2006.01)
*F16G 11/06* (2006.01)

(52) U.S. Cl.
CPC ............ *F16G 11/025* (2013.01); *F16G 11/02* (2013.01); *F16G 11/06* (2013.01); *Y10T 24/3969* (2015.01);
(Continued)

(58) Field of Classification Search
CPC ........ F16G 11/025; F16G 11/06; F16G 11/02; Y10T 29/53952; Y10T 24/3969; Y10T 29/49927
See application file for complete search history.

(56) References Cited

U.S. PATENT DOCUMENTS 2,476,731 A * 7/1949 Hobbs, Jr. ............... F16G 11/02
140/111
2,724,098 A * 11/1955 Bergan ................... H01R 4/188
439/879

(Continued)

FOREIGN PATENT DOCUMENTS

DE  102007012039  9/2008
WO  95/08728  3/1995
(Continued)

OTHER PUBLICATIONS

English translation of DE102007012039 published on Sep. 25, 2008.*

*Primary Examiner* — Jun S Yoo
(74) *Attorney, Agent, or Firm* — Tarolli, Sundheim, Covell & Tummino LLP

(57) ABSTRACT

A method for connecting a wire cable to a cable shoe for a belt buckle mounting comprises the steps of: pre-bending a retaining portion of the cable shoe to form an eye; inserting the wire cable into the eye; extruding the retaining portion so that the outer periphery thereof is reduced. The extrusion of the retaining portion is carried out as impact extrusion, wherein a form closure is produced between the retaining portion and the wire cable. The impact extrusion is carried out by a tool including at least one edge-free first seat for the eye. An apparatus for connecting a wire cable to a cable shoe for a belt buckle mounting comprises a first tool half including a first seat for a retaining portion of the cable shoe pre-bent into an eye and an opposed second tool half
(Continued)

including a second seat for the retaining portion. The two tool halves can be forced against each other with high pressure so that the material of the retaining portion starts to flow. At least the first seat is free from edges.

11 Claims, 3 Drawing Sheets

(52) U.S. Cl.
CPC .... *Y10T 29/49927* (2015.01); *Y10T 29/53952* (2015.01)

(56) References Cited

U.S. PATENT DOCUMENTS

| | | | | |
|---|---|---|---|---|
| 4,395,900 | A * | 8/1983 | Saurenman | B21D 39/037 29/428 |
| 5,901,439 | A * | 5/1999 | Endo | H01R 43/058 29/33 M |
| 6,170,145 | B1 * | 1/2001 | Lucas | B21F 15/06 29/282 |
| 2006/0156532 | A1 | 7/2006 | Kock | |

FOREIGN PATENT DOCUMENTS

| | | |
|---|---|---|
| WO | 03/078861 | 9/2003 |
| WO | 2011/103640 | 9/2011 |

* cited by examiner

METHOD AND DEVICE FOR CONNECTING A WIRE CABLE TO A CABLE GUIDE

RELATED APPLICATIONS

This application corresponds to PCT/EP2012/004241, filed Oct. 10, 2012, which claims the benefit of German Application No. 10 2011 116 287.2, filed Oct. 19, 2011, the subject matter, of which are incorporated herein by reference in their entirety.

BACKGROUND OF THE INVENTION

The invention relates to a method for connecting a wire cable to a cable shoe for a belt buckle mounting. The invention further relates to an apparatus for connecting a wire cable to a cable shoe for a belt buckle mounting.

In particular the belt buckles for the back seat of an automotive vehicle are attached directly or indirectly to the car body with the aid of wire cables so that the belt buckles exhibit certain mobility. Even when so called linear tensioners are used, the belt buckles are fastened to wire cables, the wire cable further being connected to the piston of the linear tensioner.

From DE 10 2007 012 039 A1 a cable shoe is known by which one end of such wire cable can be connected to a belt buckle, fittings or the car body. The cable shoe is a punched sheet metal part having a fastening portion serving for fastening the cable shoe to the belt buckle, the fittings or the car body and having a retaining portion forming in a pre-bent state an eye into which the wire cable is inserted. The retaining portion includes two rims a first rim of which includes projections with a lateral thickening and the second rim includes corresponding recesses with an undercut. In the pre-bent state of the retaining portion the projections of the first rim engage in the recesses of the second rim. The retaining portion is pressed after inserting the wire cable so that the outer periphery of the eye is reduced and thus the wire cable is clamped.

Ideally the caught rims of the retaining portion are intended to form a continuous smooth surface after extrusion so that no gap and no overlapping are provided between the projections and the recesses. When force is applied to the wire cable, the projections and the recesses cannot move against each other so that the eye remains safely closed and the wire cable cannot be removed from the cable shoe.

Due to the high requirements to the load capacity of such cable connection—even with respect to the use of the cable shoe in a belt tensioner when very high tensile forces act on the wire cable—extrusion of the retaining portion has to be performed with extremely high pressure, which entails rapid wear of the pressing tool.

SUMMARY OF THE INVENTION

Against this background, it is the object of the invention to provide a reliable cable connection preventing the tool from damage.

This object is achieved by a method comprising the features of claim 1 as well as by an apparatus comprising the features of claim 3.

Advantageous and expedient configurations of the method according to the invention and the apparatus according to the invention are stated in the corresponding sub-claims.

The method according to the invention for connecting a wire cable to a cable shoe for a belt buckle mounting comprises the steps of:

pre-bending a retaining portion of the cable shoe to form an eye;

inserting the wire cable into the eye; and extruding the retaining portion so that the outer periphery thereof is reduced.

Extrusion of the retaining portion is carried out as impact extrusion. During impact extrusion a form closure is produced between the retaining portion and the wire cable. Impact extrusion is carried out with a tool having at least one edge-free first seat for the eye.

The invention is based on the finding that during impact extrusion resulting in a form closure between the retaining portion and the wire cable not only the outer periphery of the retaining portion is reduced, but material of the retaining portion is forced between the wires (strands) of the wire cable. This is resulting in a relatively strong movement of the material of the retaining portion especially in the areas in which the retaining portion pre-bent to form the eye is not closed. Such material movement is hindered by the edges present in the seats of previously used tools, which entails high friction and consequently rapid wear of the tool. Compared to this, performing impact extrusion according to the invention by an seat without edges permits a largely unhindered material movement in the area of the seat so that the tool is subjected to definitely less wear and can be used for a longer time.

The method according to the invention is especially suited for a cable shoe comprising a retaining portion pre-bent into an eye, as it is known from DE 10 2007 012 039 A1.

The invention also provides an apparatus for connecting a wire cable to a cable shoe for a belt buckle mounting. The apparatus according to the invention comprises a first tool half including a first seat for a retaining portion of the cable shoe pre-bent into an eye and an opposed second tool half including a second seat for the retaining portion. The two tool halves can be pressed against each other with high pressure so that the material of the retaining portion starts to flow. At least the first seat is free from edges.

Concerning the advantages obtained by the apparatus according to the invention, the foregoing remarks relating to the method according to the invention are referred to.

In the preferred embodiment of the apparatus according to the invention, the first seat has a semicircular cross-section. Said cross-section corresponds to the pre-bent shape of the retaining portion but with a smaller diameter. The semicircular cross-section permits optimum mobility of the material of the retaining portion without material accumulation during extrusion.

Finally the present invention also describes a use of the method according to the invention or of the apparatus according to the invention for a cable shoe having a retaining portion pre-bent into an eye which comprises a wire cable and on a front side has two rims the first rim of which includes at feast one projection with a lateral thickening and the second rim includes at least one recess with an undercut, wherein the projection with the thickening is provided in the recess with the undercut.

Exactly in the case of such cable shoe the use of the method according to the invention and of the apparatus according to the invention especially results in the afore-explained advantages.

In particular when the cable shoe is inserted into the tool so that the edge-free first seat faces the front side of the retaining portion, during forming a low-friction flow of the material of the retaining portion which thus prevents damage of the tool is enabled.

BRIEF DESCRIPTION OF THE DRAWINGS

Further features and advantages of the invention are resulting from the following description and from the enclosed drawings which are referred to and in which.

DESCRIPTION OF THE EMBODIMENTS

Figure 1:
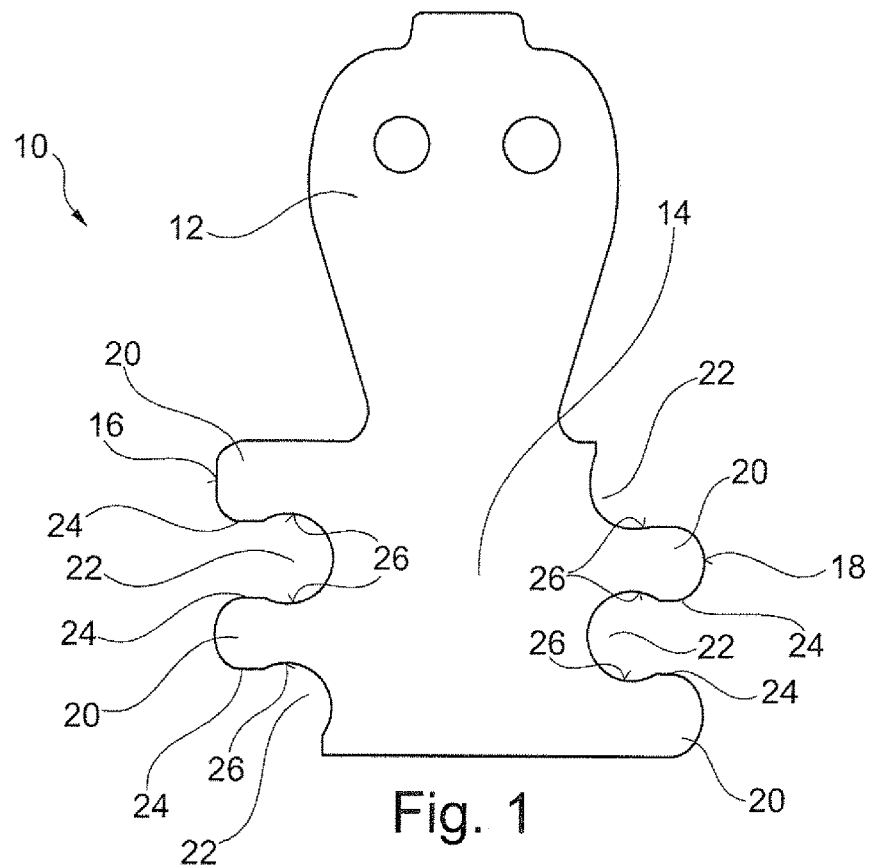
FIG. 1 shows a front-side view of a cable shoe in the unwound state.

In FIG. 1 a cable shoe 10 is shown as stamped sheet-metal part in the initial condition without a wire cable to be fastened. The cable shoe 10 includes a fastening portion 12 serving for attaching the cable shoe 10 to a belt buckle, fittings or a car body. The fastening portion 12 is integrally transformed into a retaining portion 14 having two rims 16, 18 with complementary projections 20 and recesses 22. The projections 20 include lateral thickenings 24 which exhibit the same contour as pertaining undercuts 26 of the recesses 22. The fastening portion 12 can also have a shape different from the one shown here, for example as a ring or eye, and can serve for fastening the belt webbing.

Figure 2:
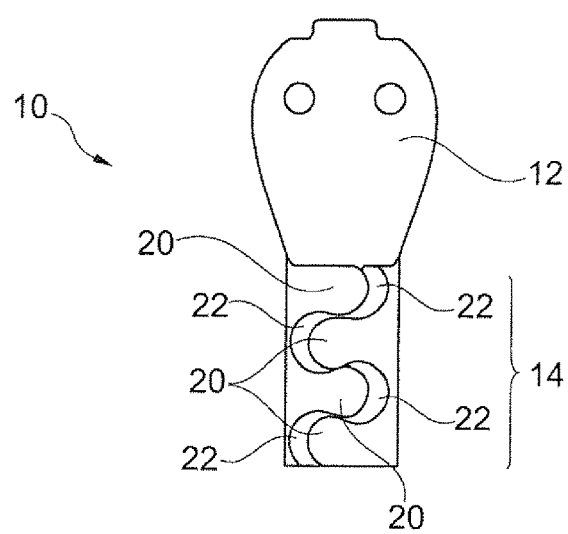
FIG. 2 shows a front-side view of the cable shoe in a pre-bent state.

The retaining portion 14 of the cable shoe 10 is pre-bent to form an eye the inner diameter of which is larger than the wire cable to be fastened. This intermediate condition is illustrated in FIG. 2. Although the projections 20 already engage in the corresponding recesses 22, there are still gaps provided, however.

Figure 3:
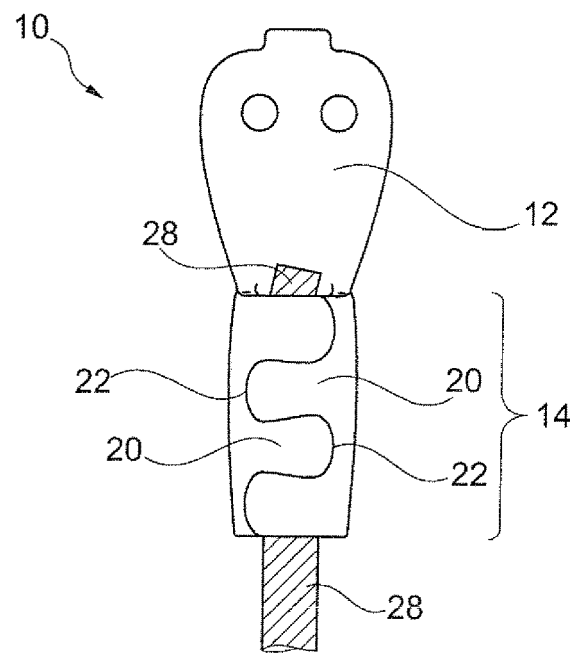
FIG. 3 shows a front-side view of the cable shoe with a wire cable in a pressed state.

FIG. 3 shows the cable shoe 10 and a wire cable 28 fastened thereto in the final condition of fabrication. The wire cable 28 was inserted into the eye before and the retaining portion 14 was subsequently pressed with the wire cable 28 with very high pressure. During this pressing operation the outer diameter of the eye is reduced and a form closure occurs between the retaining portion 14 and the wire cable 28 in that material of the retaining portion 14 is forced between the individual strands of the wire cable 28. Hence this form closure exceeds a simple force closure or frictional connection (clamping connection).

Figure 4:
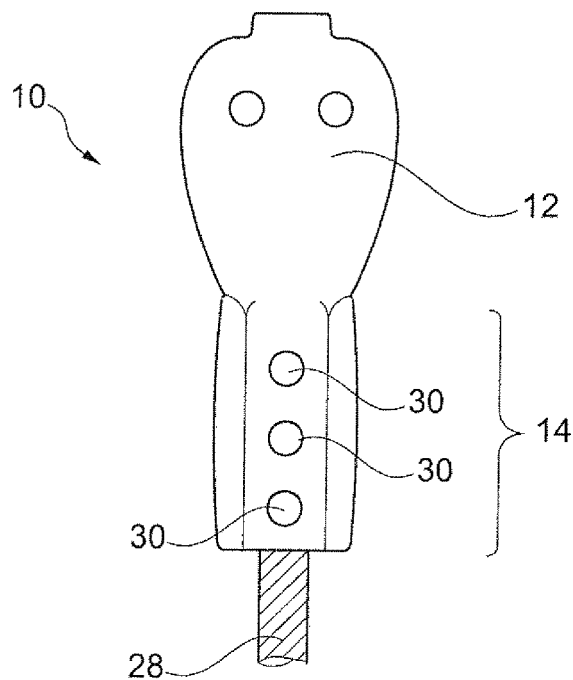
FIG. 4 shows a rear-side view of the cable shoe in the pressed state including indentations.

The formation of a form closure is assisted by indentations 30 exemplified in FIG. 4 which are embossed from outside into the retaining portion 14 during pressing the retaining portion 14 with the wire cable 28 so that they penetrate the wire cable 28 on the inside of the eye formed by the retaining portion 14. The indentations 30 protrude transversely to the direction of tension, which corresponds to the longitudinal direction of the wire cable 28, and additionally deform the wire cable 28.

The form closure between the retaining portion 14 and the wire cable is secured by the meshing of the rims 16, 18 of the retaining portion. As is evident from FIG. 3, after pressing the projections 20 of the first rim 16 engage in the recesses 22 of the second rim 18 such that substantially a smooth gap-less surface is provided, i.e. no gap and no overlapping are provided between the projections 20 and the recesses 22. Therefore, in the case of a tensile force applied to the wire cable 28 the projections 20 and the recesses 24 cannot move against each other so that the wire cable 28 is safely retained in the cable shoe 10.

Hereinafter the tool 32 used for pressing shall be described which is schematically shown in a first embodiment in FIG. 5 and in a second embodiment in FIG. 6.

The tool 32 in both cases includes a lower tool half 34 and an upper tool half 36 that are adapted to be pressed against each other with high pressure. Each of the two tool halves 34, 36 includes a seat 38 and 40, respectively, formed by the recesses in the largely massive tool halves 34, 36.

In the seats 38, 40 the retaining portion 14 of the cable shoe 10 pre-bent into the eye according to FIG. 2 and formed of a metal part with the inserted wire cable 28 is placed so that the front side of the retaining portion 14 including the opposed rims 16, 18 faces the seat 40 of the upper tool half 36 and the rear side of the retaining portion 14 faces the seat 38 of the lower tool half 34.

The lower seat 38 is in the form of a hexagon half in both embodiments. From the base extending between the edges 42 of the seat 38 individual projections 44 are protruding only one of which is visible in each of the FIGS. 5 and 6. The transitions of the hexagonal faces are rounded and have a radius amounting to approx. 1 mm.

Figure 5:
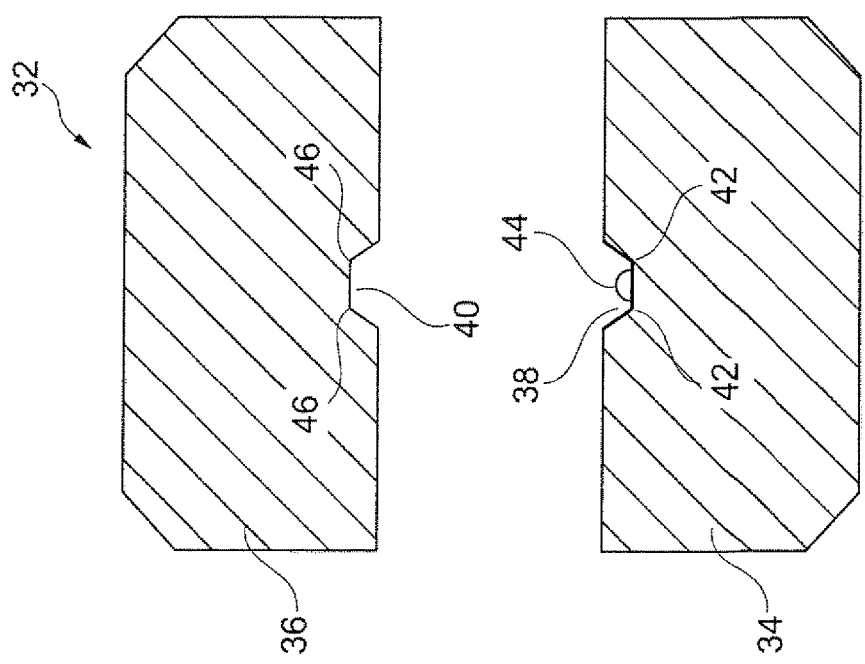
FIG. 5 shows a schematic cross-section of a pressing tool according to a first embodiment.
Figure 6:
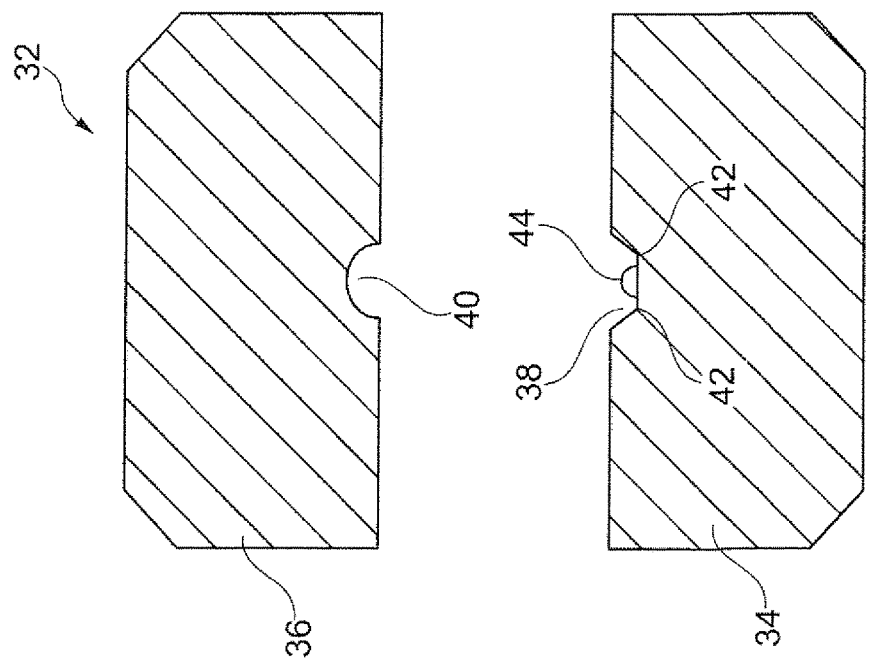
FIG. 6 shows a schematic cross-section of a pressing tool according to a second embodiment according to the invention.

The upper tool halves 36 of the tools 32 shown in FIGS. 5 and 6 are different in that in the embodiment according to FIG. 5 the upper seat 40 is formed to be substantially symmetric to the lower seat 38 (except for the projections 44), viz. as a hexagon half having edges 46, whereas in the embodiment according to FIG. 6 the upper seat 40 is free from edges, i.e. the upper seat 40 has no edges 46, rather the upper seat 40 is semicircular in cross-section in this embodiment.

The term "free from edges" in this context is to be understood to the effect that, apart from the edges at the transitions to the adjacent tool surfaces and the end faces, the seat 40 has no edges 46 inside the seat 40.

In both tool embodiments the seats 38, 40 are dimensioned so that upon pressing the retaining portion 14 with the wire cable 28 the outer periphery of the eye is reduced. At the same time, the projections 44 emboss the indentations 30 shown in FIG. 4 into the rear side of the retaining portion 14. The end faces of the tools not represented in detail prevent the portion to be pressed from being extended beyond the provided dimension.

The tool halves 34, 36 are forced against each other with high pressure so that in the area of the eye the material starts to flow. Especially on the front side of the retaining portion 14 the areas including the rims 16, 18 are moving relatively strongly. In the case of the tool 32 according to the first embodiment this results in an especially high stress of the upper seat 40, above all at the edges 46. In the case of the tool 32 according to the second embodiment this stress is clearly reduced, as the upper seat 40 includes no inner edges. Therefore, the material in this case can move largely unhindered so that in comparison the wear of the upper tool half 36 is clearly reduced.

As a matter of course, also the lower seat 38 of the tool 32 can be configured without edges 42. In this area the wear of the tool 32 is not that critical, as here only a comparatively low material movement of the retaining portion 14 occurs.

When the described tool is used, pressing can be carried out without additional dies.

LIST OF REFERENCE NUMERALS 10 cable shoe
12 fastening portion
14 retaining portion
16 first rim
18 second rim
20 projection
22 recess
24 thickening
26 undercut
28 wire cable
30 indentation
32 tool
34 lower tool half
36 upper tool half
38 seat of the lower tool half
40 seat of the upper tool half
42 edge in the lower tool half
44 projection
46 edge in the upper tool half

The invention claimed is:

1. A method for connecting a wire cable (28) to a cable shoe (10) for a belt buckle mounting, comprising the steps of:
  pre-bending a retaining portion (14) of the cable shoe to form an eye;
  inserting the wire cable (28) into the eye;
  extruding the retaining portion (14) so that the outer periphery thereof is reduced;
  wherein the extrusion of the retaining portion (14) is carried out as impact extrusion,
  the impact extrusion is carried out by a tool (32) including a first tool half (34) having a first seat (38) and an opposed second tool half (36) having a second seat (40), at least one of the first and second seats (38, 40) being edge-free for the eye, the first seat (38) having at least one projection (44), the at least one projection (44) being fixedly positioned on the first seat (38), and
  during the impact extrusion, a form closure is produced between the retaining portion (14) and the wire cable (28), and the at least one projection (44) embosses at least one indentation (30) into the retaining portion (14) such that the at least one indentation (30) penetrates the wire cable (28) on an inside of the eye formed by the retaining portion (14).

2. The method according to claim 1, wherein both the first and second seats (38, 40) of the tool (32) are opposed edge-free seats (38, 40) for the eye.

3. The method according to claim 1, wherein the tool (32) includes the second tool half (36) having the second seat (40) for the retaining portion (14) of the cable shoe (10) pre-bent into an eye and the opposed first tool half (34) which includes the first seat (38) for the retaining portion (14), and the two tool halves (34, 36) can be forced against each other with high pressure so that the material of the retaining portion (14) starts to flow.

4. The method according to claim 3, wherein the second seat (40) has a semicircular cross-section.

5. The method according to claim 3, wherein the first seat (38) is free from edges.

6. The method according to claim 1, wherein the retaining portion (14) pre-bent into an eye having the inserted wire cable (28) includes two rims (16, 18) on a front side, the first rim (16) having at least one projection (20) with a lateral thickening (24), the second rim (18) having at least one recess (22) with an undercut (26), the projection (20) with the thickening (24) being provided in the recess (22) with the undercut (26) when the retaining portion (14) is pre-bent into an eye.

7. The method according to claim 6, wherein the second seat (40) is opposed to the front side of the retaining portion (14).

8. The method according to claim 1, further including pre-bending the retaining portion (14) of the cable shoe (10) to form an eye so that at least one projection (20) of the retaining portion (14) is arranged in a corresponding recess (22) of the retaining portion (14) in such a manner that there is a gap between at least a portion of the projection (20) and at least a portion of the corresponding recess (22).

9. The method according to claim 8, further including placing the pre-bent cable shoe (10) with the inserted wire cable (16) in the tool (32) so that a front side of the retaining portion (14) having the recess (22) and the projection (20), which is arranged in the recess (22) in such a manner that there is a gap between at least a portion of the projection (20) and at least a portion of the corresponding recess (22), faces the second seat (40) of the tool (32), and a rear side of the retaining portion (14) faces the first seat (38) of the tool (32).

10. The method according to claim 1, wherein the first and second tool halves (34, 36) are forced against each other to extrude the retaining portion (14), and as the first and second tool halves (34, 36) are forced against each other to extrude the retaining portion (14), the at least one projection (44) of the first seat (38) embosses at least one indentation (30) into the retaining portion (14) such that the at least one indentation (30) penetrates the wire cable (28) on the inside of the eye formed by the retaining portion (14).

11. The method according to claim 1, wherein the at least one projection (44) is integrally formed on the first seat and extends from the first seat (38) toward the opposed second seat (40).

* * * * *